US012602003B2

(12) United States Patent
Takiguchi et al.

(10) Patent No.: US 12,602,003 B2
(45) Date of Patent: Apr. 14, 2026

(54) TONER CARTRIDGE HAVING A WALL WITH A CURVED PORTION AND AN IMAGE FORMING APPARATUS

(71) Applicant: FUJIFILM Business Innovation Corp., Tokyo (JP)

(72) Inventors: Toshio Takiguchi, Kanagawa (JP); Yosuke Shimomoto, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 14 days.

(21) Appl. No.: 18/365,381

(22) Filed: Aug. 4, 2023

(65) Prior Publication Data

US 2024/0019809 A1 Jan. 18, 2024

Related U.S. Application Data

(63) Continuation of application No. PCT/JP2021/034098, filed on Sep. 16, 2021.

(30) Foreign Application Priority Data

Mar. 26, 2021 (JP) ................................ 2021-054283

(51) Int. Cl.

| | |
|---|---|
| ***G03G 21/16*** | (2006.01) |
| ***G03G 15/08*** | (2006.01) |
| ***G03G 21/12*** | (2006.01) |

(52) U.S. Cl.

CPC ..... *G03G 21/1647* (2013.01); *G03G 15/0865* (2013.01); *G03G 15/0868* (2013.01);

(Continued)

(58) Field of Classification Search

CPC ........... G03G 21/1647; G03G 15/0865; G03G 21/1676; G03G 15/0875; G03G 21/12;

(Continued)

(56) References Cited

U.S. PATENT DOCUMENTS 5,260,750 A * 11/1993 Ishida .................... G03G 21/12 399/262

D1,016,138 S * 2/2024 Akaike ......................... D18/43

(Continued)

FOREIGN PATENT DOCUMENTS

JP 2008-122825 A 5/2008

JP 2011-232399 A 11/2011

(Continued)

OTHER PUBLICATIONS

Oct. 26, 2021 International Search Report issued in International Patent Application No. PCT/JP2021/034098.

(Continued)

*Primary Examiner* — Stephanie E Bloss

*Assistant Examiner* — Laura Roth

(74) *Attorney, Agent, or Firm* — Oliff PLC

(57) ABSTRACT

A toner cartridge includes a first accommodating portion that accommodates toner, and a second accommodating portion that accommodates toner. A first connection portion that is provided at the first accommodating portion connects the first accommodating portion to the outside. A second connection portion that is provided at an end portion of the second accommodating portion connects the second accommodating portion to the outside. A wall of the second accommodating portion that is located on one side of a second direction that intersects with the first direction has a curved portion that protrudes toward one side of the second direction, and the curved portion includes the part of the wall of the second accommodating portion that overlaps with the second connection portion in the second direction.

8 Claims, 12 Drawing Sheets

(52) U.S. Cl.
CPC ......... *G03G 21/12* (2013.01); *G03G 21/1676* (2013.01); *G03G 2215/0685* (2013.01); *G03G 2221/1624* (2013.01)

(58) Field of Classification Search
CPC ....... G03G 15/0868; G03G 2215/0685; G03G 2221/1624
See application file for complete search history.

(56) References Cited

U.S. PATENT DOCUMENTS

| | | | | | |
|---|---|---|---|---|---|
| D1,019,763 | S * | 3/2024 | Akaike | D18/43 |
| D1,024,188 | S * | 4/2024 | Akaike | D18/43 |
| D1,042,616 | S * | 9/2024 | Akaike | D18/43 |
| D1,042,617 | S * | 9/2024 | Akaike | D18/43 |
| D1,043,811 | S * | 9/2024 | Akaike | D18/43 |
| 2010/0322666 | A1* | 12/2010 | Inomata | G03G 21/10 399/120 |
| 2011/0262188 | A1* | 10/2011 | Awano | G03G 15/0875 399/258 |
| 2017/0003627 | A1 | 1/2017 | Inada | |
| 2017/0235273 | A1 | 8/2017 | Mimura et al. | |
| 2017/0357181 | A1* | 12/2017 | Sue | G03G 21/12 |
| 2023/0384712 | A1* | 11/2023 | Takiguchi | G03G 15/08 |
| 2023/0393492 | A1* | 12/2023 | Takiguchi | G03G 21/0005 |

FOREIGN PATENT DOCUMENTS

| | | | |
|---|---|---|---|
| JP | 2017-015896 | A | 1/2017 |
| JP | 2017-146345 | A | 8/2017 |
| JP | 2017-219724 | A | 12/2017 |
| WO | 2014/017357 | A1 | 1/2014 |

OTHER PUBLICATIONS

Oct. 26, 2021 Written Opinion of the International Searching Authority issued in International Patent Application No. PCT/JP2021/034098.
Apr. 22, 2025 Office Action issued in Japanese Patent Application No. 2021-054283.
Jan. 20, 2025 Search Report issued in European Patent Application No. 21933191.5.
Jul. 22, 2025 Office Action issued in Japanese Patent Application No. 2021-054283.
Feb. 10, 2025 Office Action issued in Chinese Patent Application No. 202180093175.X.

* cited by examiner

TONER CARTRIDGE HAVING A WALL WITH A CURVED PORTION AND AN IMAGE FORMING APPARATUS

CROSS-REFERENCE TO RELATED APPLICATIONS

This is a continuation of International Application No. PCT/JP2021/034098 filed on Sep. 16, 2021, and claims priority from Japanese Patent Application No. 2021-054283 filed on Mar. 26, 2021.

BACKGROUND

(i) Technical Field

The present disclosure relates to a toner cartridge and an image forming apparatus.

(ii) Related Art

Japanese Unexamined Patent Application Publication No. 2011-232399 describes a mounting structure of an attaching/detaching member. The mounting structure includes a body, the attaching/detaching member that is attached to and detached from the body, a functional member that is provided at the attaching/detaching member and that has a prescribed function, a first gear that is provided at the attaching/detaching member and that transmits power between it and the functional member, a second gear that is provided at the body and that, when the attaching/detaching member is mounted on the body, engages with the first gear and transmits power between it and the first gear, and a covering member that is provided at the body, that, when the attaching/detaching member is mounted on the body, moves to an engageable position allowing the second gear and the first gear to engage with each other, and that, when the attaching/detaching member is separated from the body, moves from the engageable position and covers at least part of the second gear from an engagement side of the first gear.

SUMMARY

Aspects of non-limiting embodiments of the present disclosure relate to providing a toner cartridge whose toner cartridge capacity is increased compared to a toner cartridge capacity of a structure in which a wall facing an intersection direction of a toner cartridge including two accommodating portions that are disposed side by side in one direction is flat in an entirety of the wall in the one direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

[1] According to an aspect of the present disclosure, there is provided a toner cartridge including a first accommodating portion that accommodates toner; a second accommodating portion that is disposed on one side in a first direction with respect to the first accommodating portion and that accommodates toner; a first connection portion that is provided at the first accommodating portion and that connects the first accommodating portion to outside; and a second connection portion that is provided at an end portion of the second accommodating portion, the end portion being situated on another side of the second accommodating portion in the first direction, and that connects the second accommodating portion to outside, in which, of walls of the second accommodating portion, the walls being situated on one side of the second accommodating portion in a second direction that intersects the first direction, a wall that is situated at a position that corresponds to a position of the second connection portion in the first direction has a curved portion that at least partly protrudes toward the one side of the second accommodating portion in the second direction.

BRIEF DESCRIPTION OF THE DRAWINGS

An exemplary embodiment of the present disclosure will be described in detail based on the following figures, wherein.

DETAILED DESCRIPTION

A container group and an image forming apparatus 10 including the container group according to an exemplary embodiment of the present disclosure are described in accordance with FIGS. 1 to 12.

Note that, in the description below, in front view of the image forming apparatus 10 from a side at which a user (not shown) stands, an apparatus up-down direction (height direction), an apparatus width direction (horizontal direction), and an apparatus depth direction (horizontal direction) are described as an H direction, a W direction, and a D direction, respectively. When it is necessary to distinguish between one side and another side in each of the apparatus up-down direction, the apparatus width direction, and the apparatus depth direction, in the front view of the image forming apparatus 10, an upper side is described as a +H side, a lower side is described as a −H side, a right side is described as a +W side, a left side is described as a −W side, a far side is described as a −D side, and a near side is described as a +D side.

The apparatus up-down direction is an example of a first direction, the lower side is an example of one side in the first direction, and the upper side is an example of another (the other) side in the first direction. The apparatus width direction is an example of a second direction that intersects the first direction, the left side is an example of one side in the second direction that intersects the first direction, and the right side is an example of another (the other) side in the second direction that intersects the first direction.

Image Forming Apparatus

Figure 1:
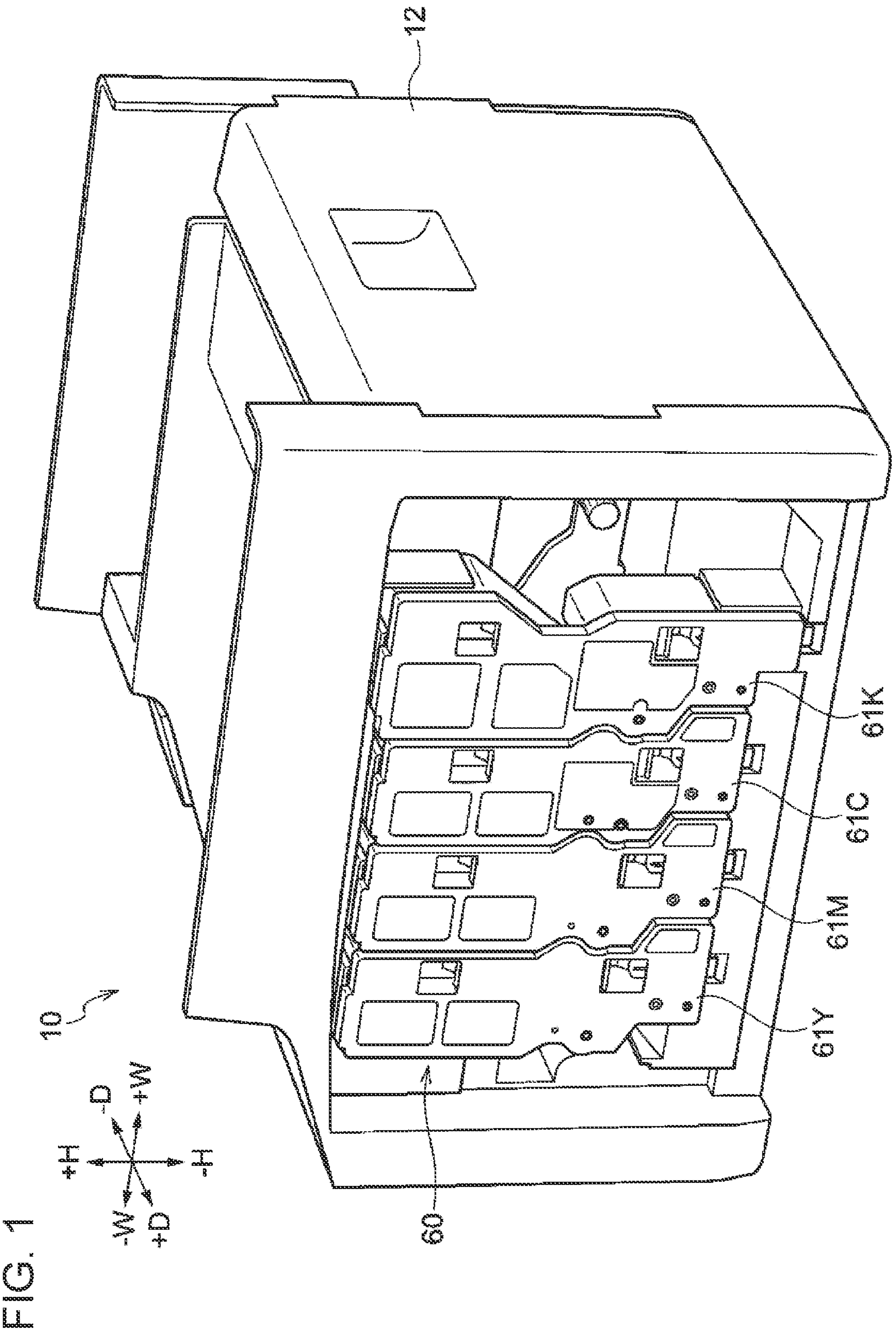
FIG. 1 is a perspective view showing an image forming apparatus according to an exemplary embodiment.
Figure 2:
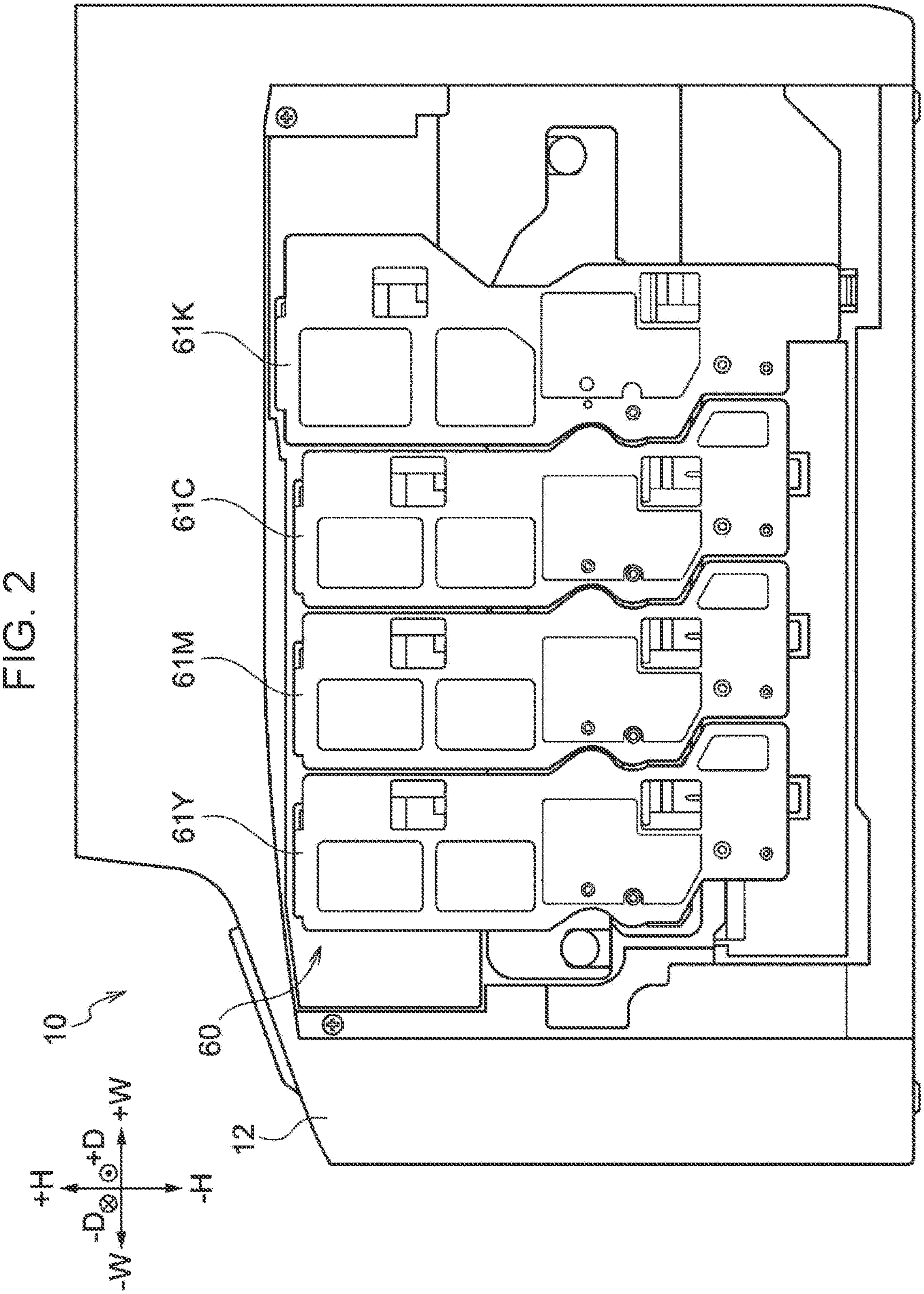
FIG. 2 is a front view showing a state of the image forming apparatus according to the exemplary embodiment to which a toner cartridge group is attached.
Figure 10:
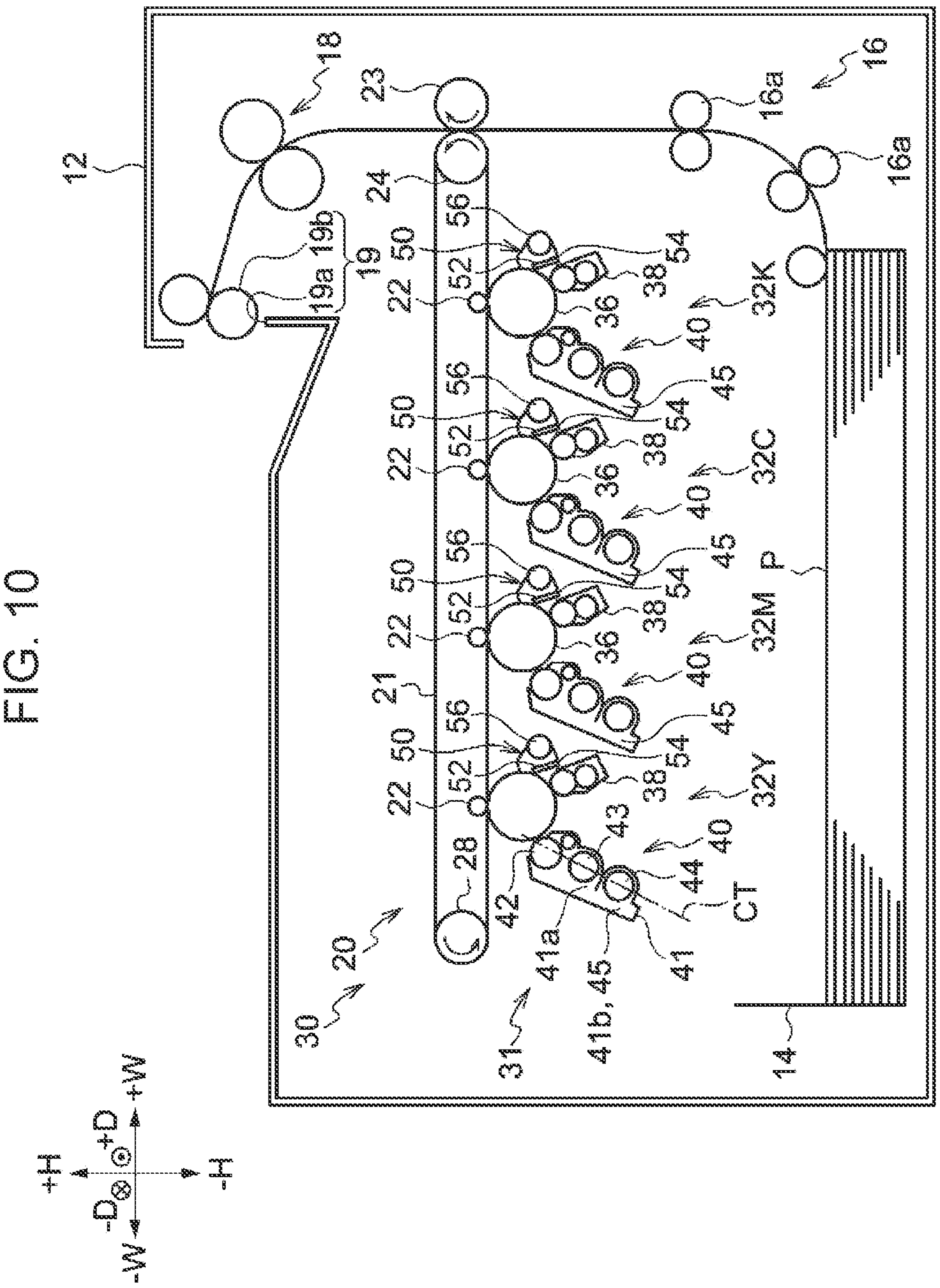
FIG. 10 is a schematic front view showing an internal structure of the image forming apparatus according to the exemplary embodiment.

The image forming apparatus 10 according to the exemplary embodiment is an electrophotographic image forming apparatus that forms an image on a sheet member P, used as a recording medium, by using toner T. The toner T is an example of powder. As shown in FIG. 10, the image forming apparatus 10 includes a housing 12, a medium accommodating portion 14, a transporting portion 16, an image forming section 30, a fixing portion 18, and a medium discharging portion 19. As shown in FIGS. 1 and 2, the image forming apparatus 10 further includes a toner cartridge group 60.

As shown in FIGS. 1 and 10, the housing 12 accommodates each portion that constitutes the image forming apparatus 10. The medium accommodating portion 14 is provided at the bottom of the housing 12, includes a draw-out tray that is capable of being drawn out toward the −W side with respect to the housing 12, and has the function of accommodating sheet members P. The transporting portion 16 includes transporting rollers 16*a*, and has the function of transporting to the image forming section 30 the sheet members P that are accommodated in the medium accommodating portion 14.

Image Forming Section

The image forming section 30 is accommodated in a space on the upper side with respect to the medium accommodating portion 14 in the housing 12, and includes a photoconductor unit group 31 and a transfer section 20.

Photoconductor Unit Group

The photoconductor unit group 31 includes four photoconductor units 32Y, 32M, 32C, and 32K, and a holder 34 (see FIGS. 4 and 5) that holds the photoconductor units 32Y, 32M, 32C, and 32K. The photoconductor units 32Y, 32M, 32C, and 32K have the same structure except that toners T that they use differ in color. The photoconductor units 32Y, 32M, 32C, and 32K are held by the holder 34 while being disposed side by side in order from the −W side in the apparatus width direction and overlapping in the up-down direction. Here, yellow (Y), magenta (M), cyan (C), and black (K) are each one example of a toner color. Note that when the toner colors are not particularly distinguished, the photoconductor units are described without the final alphabet letters. Each photoconductor unit 32 is an example of an apparatus unit. The photoconductor unit group 31 is an example of an apparatus unit group.

Figure 5:
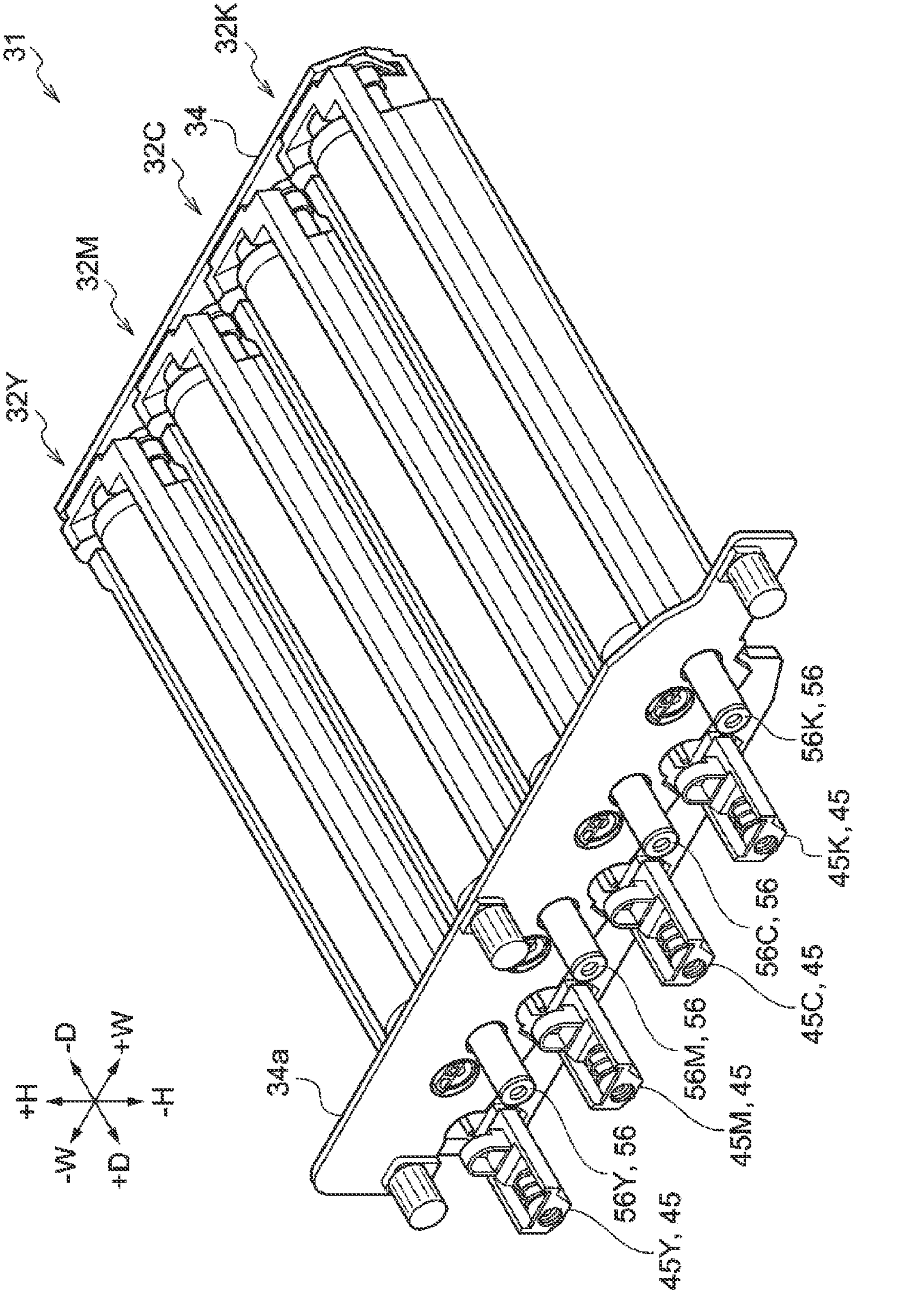
FIG. 5 is a perspective view showing the image forming section according to the exemplary embodiment.
Figure 6:
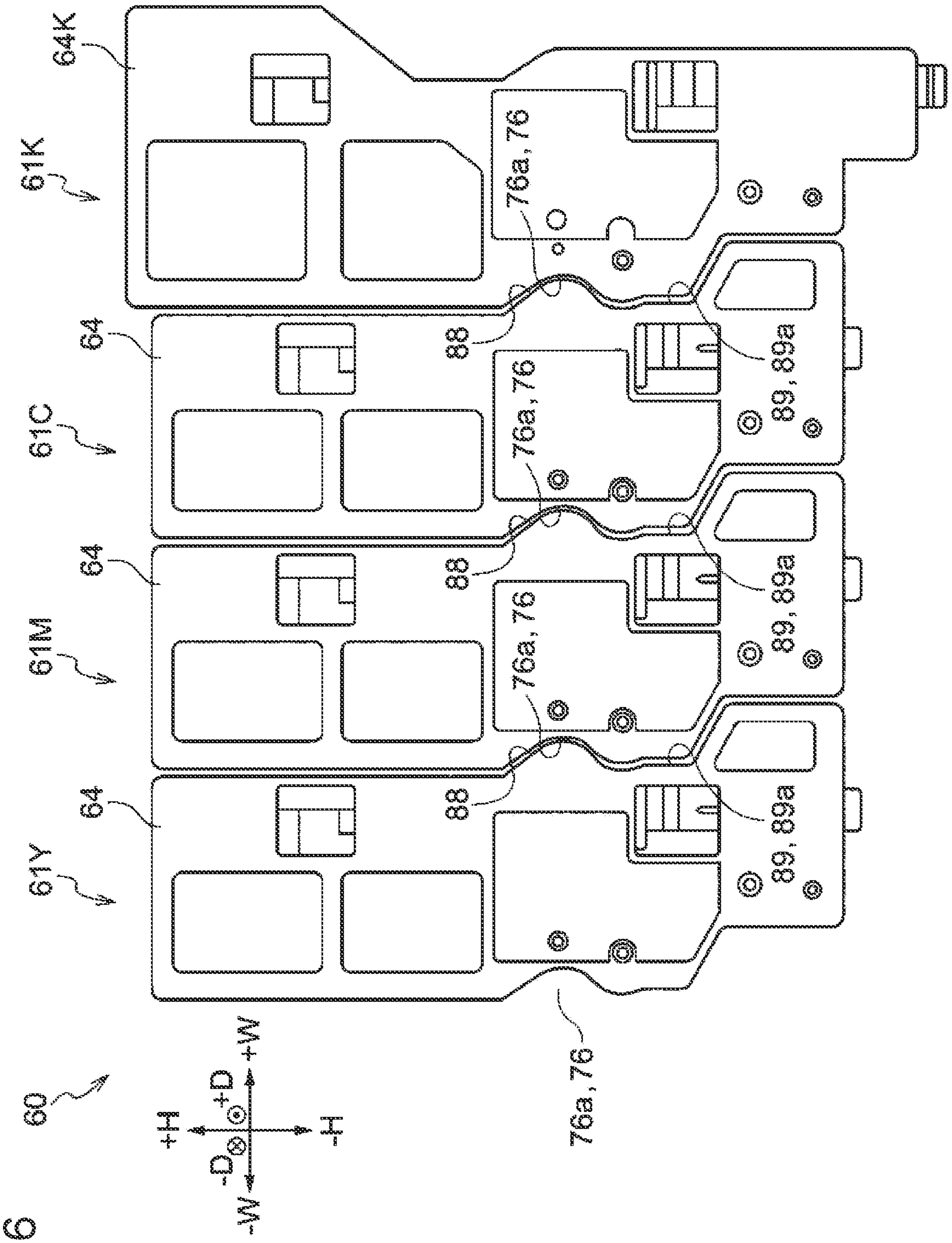
FIG. 6 is a front view showing the toner cartridge group according to the exemplary embodiment.

As shown in FIG. 5, the holder 34 is a frame-like member that includes a plate portion 34*a* extending along an HW plane and disposed to cover part of the four photoconductor units 32 from the +D side.

In describing the photoconductor units 32Y, 32M, 32C, and 32K, the structure of the photoconductor unit 32M is described as a typical example.

As shown in FIG. 10, the photoconductor unit 32M includes a photoconductor drum 36, a charging device 38, an exposure device (not shown), a developing device 40, and a removing device 50. The photoconductor drum 36 is provided to be rotatable in the apparatus depth direction, and is rotated clockwise in the front view of the image forming apparatus 10 by a motor (not shown). The photoconductor drum extends in the apparatus depth direction. The photoconductor drum 36 has the function of carrying an electrostatic latent image on the outer peripheral surface thereof. The charging device 38 has the function of charging the outer peripheral surface of the photoconductor drum 36 to a predetermined potential. The exposure device (not shown) has the function of causing light to be focused on the charged photoconductor drum 36 and forming an electrostatic latent image on the charged photoconductor drum 36.

The developing device 40 has the function of, by using unused toner T supplied from the toner cartridge group 60 described below, developing the electrostatic latent image formed on the photoconductor drum 36 to form a toner image. The developing device 40 is an example of a toner using device. As shown in FIG. 10, the developing device 40 is disposed on the −W side with respect to the photoconductor drum 36.

Figure 11:
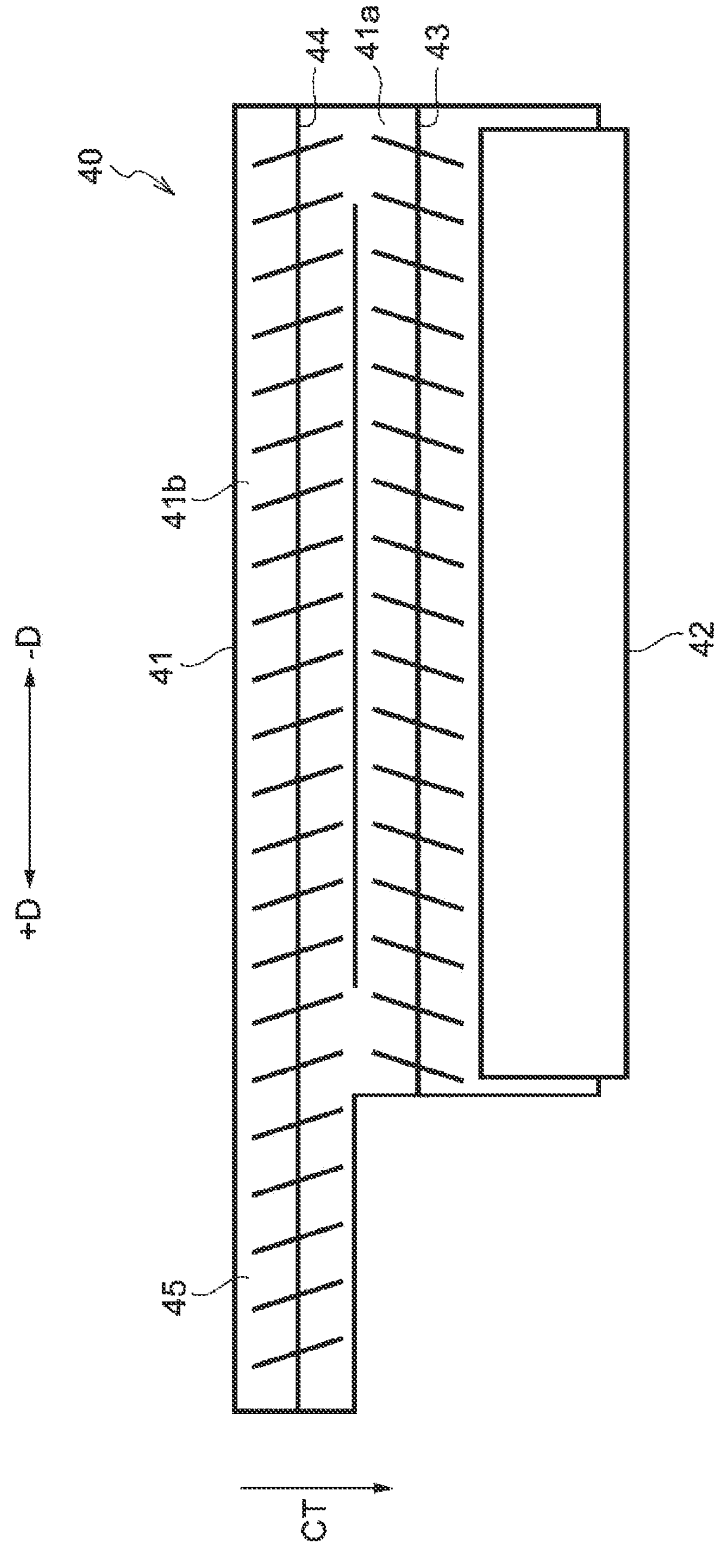
FIG. 11 is a plan sectional view showing an internal structure of a developing device according to the exemplary embodiment.
Figure 12:
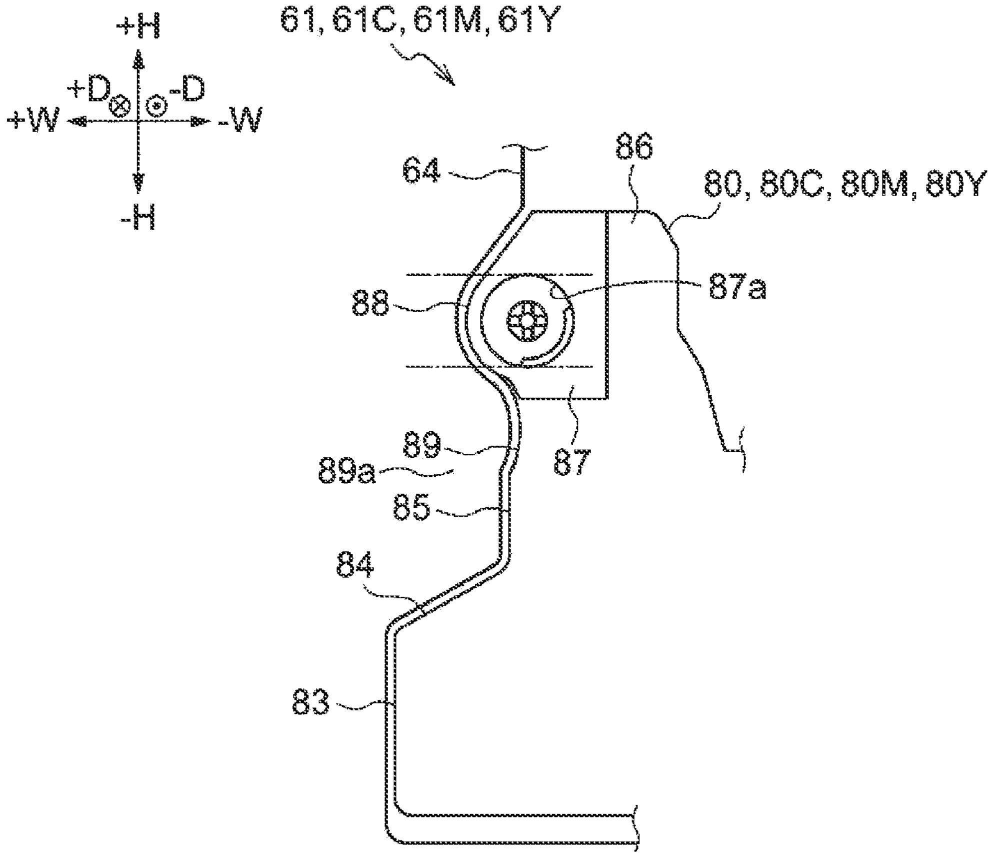
FIG. 12 is an enlarged rear view showing part of the toner cartridge according to the exemplary embodiment.

As shown in FIG. 11, the developing device 40 includes a housing 41, a developing roller 42, a supplying auger 43, and a stirring auger 44. The housing 41 accommodates unused toner T supplied from a toner cartridge 61 through a supply portion 45 of the housing 41. The housing 41 has a supplying path 41*a*, in which the supplying auger 43 that is described below is disposed, and a stirring path 41*b*, in which the stirring auger 44 that is described below is disposed. The supplying path 41*a* is a flow path that is formed on a side opposite to the photoconductor drum 36 with the developing roller 42 that is described below interposed therebetween, and that extends in the apparatus depth direction. The stirring path 41*b* is a flow path that is formed on a side opposite to the developing roller 42 with the supplying path 41*a* interposed therebetween, and that extends in the apparatus depth direction. The stirring path 41*b* and the supplying path 41*a* are connected to each other at their two end portions in the apparatus depth direction and form a circulation path.

As shown in FIGS. 10 and 11, the developing roller 42 is a roller member that is disposed on the −W side with respect to the photoconductor drum 36 and that extends in the apparatus depth direction. The developing roller 42 in a state in which toner T inside the housing 41 is adhered to the surface of the developing roller 42 rotates in the apparatus depth direction to adhere the toner T to an electrostatic latent image formed on the surface of the photoconductor drum 36 and to develop the electrostatic latent image.

The supplying auger 43 is disposed inside the supplying path 41*a* of the housing 41, and is a member that has a rotary shaft extending in the apparatus depth direction. The supplying auger 43 has the function of supplying the toner T inside the housing 41 to the developing roller 42 by rotating on the rotary shaft.

The stirring auger 44 is disposed inside the stirring path 41*b* of the housing 41, and is a member that has a rotary shaft extending in the apparatus depth direction. The stirring auger 48 has the function of stirring the toner T inside the housing 41 by rotating on the rotary shaft.

The supplying auger 43 and the stirring auger 44 are each configured to circulate the toner T inside a circulation path by rotating on the rotary shaft, the circulation path being formed by the supplying path 41*a* and the stirring path 41*b*.

When viewed from the apparatus depth direction, the developing roller 42 is disposed to overlap an imaginary straight line CT that connects the center of the rotary shaft of the supplying auger 43 and the center of the rotary shaft of the stirring auger 44. That is, the developing device 40 extends in a direction along the imaginary straight line CT in the HW plane. The angle between the imaginary straight line CT and a vertical straight line that extends in the apparatus up-down direction is 45 degrees or less. That is, the developing device 40 is disposed in an orientation along the apparatus up-down direction.

The supply portion 45 is connected to a +D side end portion of the stirring path 41*b* and is a member that protrudes and extends toward the +D side from the +D side end portion of the stirring path 41*b*. That is, the supply portion 45 is formed on the +D side of the developing device 40. As shown in FIG. 5, the supply portion 45 protrudes toward the +D side with respect to the plate portion 34*a* of the holder 34. The supply portion 45 is connected to a supplying portion 74 (details given below) of the toner cartridge 61 corresponding to the toner color of the photoconductor unit 32 (see FIG. 4). The supply portion 45 has the function of supplying unused toner T to the stirring path 41*b*, the unused toner T being supplied from the toner cartridge 61 through the supplying portion 74.

The removing device 50 has the function of removing from the photoconductor drum 36 a remaining toner image remaining on the photoconductor drum 36 after a toner image formed on the photoconductor drum 36 by the developing device 40 has been transferred to the transfer section 20 that is described below. As shown in FIG. 10, the removing device 50 includes a blade 52, a housing 54, and a discharge portion 56. The blade 52 is in contact with the surface of the photoconductor drum 36 and has the function of scraping off the toner T of the remaining toner image from the rotating photoconductor drum 36 and removing the toner T from the photoconductor drum 36. The housing 54 has the function of accommodating therein the toner T scraped off by the blade 52. In other words, the removing device 50 is used at the developing device 40 and has the function of receiving by the housing 54 the used toner T removed from the photoconductor drum 36 by the blade 52. The removing device 50 is an example of a receiving device.

The discharge portion 56 is a portion that protrudes and extends toward the +D side from a +D-side end portion of the housing 54. That is, the discharge portion 56 is formed on the +D side of the removing device 50. The discharge portion 56 protrudes toward the +D side from an opening formed in the plate portion 34*a* of the holder 34. The discharge portion 56 is connected to a collecting portion 87 (details are given below) of the toner cartridge 61 corresponding to the toner color of the photoconductor unit 32. The discharge portion 56 has the function of discharging to the toner cartridge 61 the used toner T inside the housing 54 through the collecting portion 87.

Figure 4:
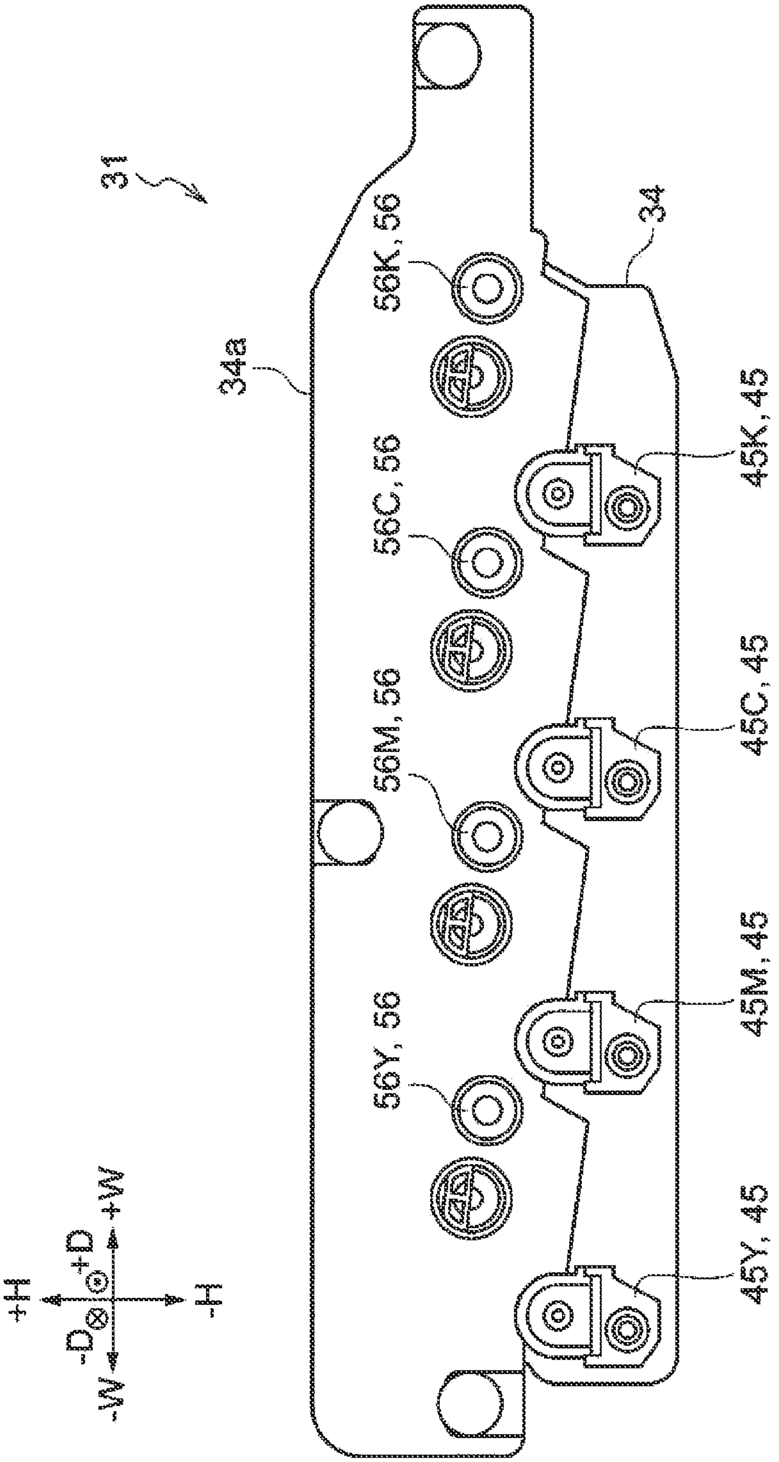
FIG. 4 is a front view showing an image forming section according to the exemplary embodiment.

As shown in FIGS. 4 and 10, the discharge portion 56 is disposed on the +H side with respect to the supply portion 45 of the developing device 40 in the apparatus up-down direction. In addition, the discharge portion 56 is disposed on the +W side with respect to the supply portion 45 of the developing device 40. Part of the +W side of the discharge portion 56 of the photoconductor unit 32M overlaps, in the apparatus width direction, the supply portion of the developing device 40 of the photoconductor unit 32C that is disposed on the +W side of the photoconductor unit 32M. That is, the discharge portion 56 of the photoconductor unit 32 overlaps in the apparatus width direction the supply portion 45 of another photoconductor unit 32 that is disposed on the +W side of the photoconductor unit 32.

Transfer Section

As shown in FIG. 10, the transfer section 20 includes a transfer belt 21, first-transfer rollers 22 that each correspond to a corresponding one of the four photoconductor units 32Y, 32M, 32C, and 32K, a second transfer roller 23, a backup roller 24, and a supporting roller 28.

The transfer belt 21 is an endless belt that is disposed on the upper side (on the +H side of) the photoconductor unit group 31 and that, being oriented in a flat state in the apparatus width direction, circulates counterclockwise in front view (the +D side). The transfer belt 21 is such that its inner peripheral surface is supported by the first transfer rollers 22, the backup roller 24, and the supporting roller 28.

The transfer belt 21 is such that outer peripheral portions of portions thereof that are supported by the first transfer rollers 22 are each in contact with the photoconductor drum 36 of a corresponding one of the photoconductor units 32Y, 32M, 32C, and 32K. Toner images formed on the photoconductor drums 36 are first-transferred to the transfer belt 21 while the transfer belt 21 circulates counterclockwise when viewed from the +D side.

The supporting roller 28 is disposed on an inner side of the transfer belt 21 at a −W-side turn-around portion of the transfer belt 21 that is oriented in the flat state.

The backup roller 24 is disposed on the inner side of the transfer belt 21 at a +W-side turn-around portion of the transfer belt 21 that is oriented in the flat state.

The second transfer roller 23 is disposed to face the backup roller 24 with the transfer belt 21 being interposed therebetween. The second transfer roller 23 second-transfers the toner image that has been first-transferred to the outer peripheral surface of the transfer belt 21 to a sheet member P transferred to a position where it faces the backup roller 24 with the transfer belt 21 being interposed therebetween. Further, the second transfer roller 23 transfers the sheet member P to which the toner image has been second-transferred to the fixing portion 18.

Fixing Portion

The fixing portion 18, by heating and pressing the sheet member P transported from the image forming section 30, fixes to the sheet member P the image transferred to the sheet member P at the image forming section 30. The fixing portion 18 transports the sheet member P to which the image has been fixed to the medium discharging portion 19.

Medium Discharging Portion

The medium discharging portion 19 includes a discharge opening 19*a* that is formed in the housing 12 and a discharge roller pair 19*b* that is disposed at the discharge opening 19*a*. The medium discharging portion 19 discharges the sheet member P transported from the fixing portion 18 from the discharge opening 19*a* by using the discharge roller pair 19*b*.

Toner Cartridge Group

Figure 3:
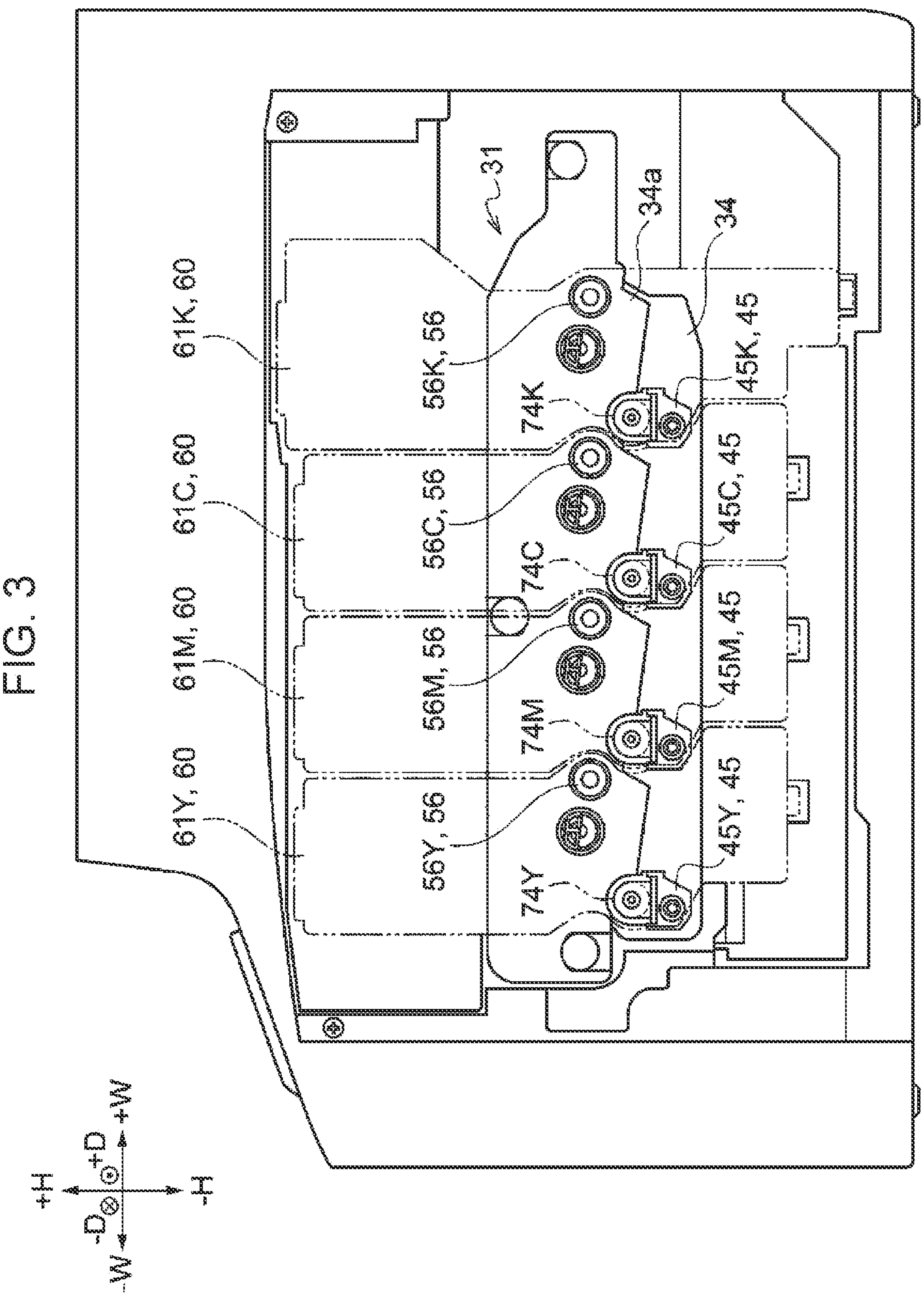
FIG. 3 is a front view showing a state of the image forming apparatus according to the exemplary embodiment from which the toner cartridge group is detached.

The toner cartridge group 60 includes four toner cartridges 61Y, 61M, 61C, and 61K corresponding to respective toner colors. As shown in FIGS. 2 and 3, the toner cartridge group 60 can be attached to and detached from the image forming apparatus 10 from the +D side. Specifically, the four toner cartridges 61Y, 61M, 61C, and 61K are each disposed to be individually attachable to and detachable from the +D side of the photoconductor unit 32 of the corresponding toner color. That is, the four toner cartridges 61Y, 61M, 61C, and 61K are disposed in order from the −W side in the apparatus width direction. The four toner cartridges 61Y, 61M, 61C, and 61K each accommodate toner T of the corresponding toner color.

Next, the structure of the four toner cartridges 61Y, 61M, 61C, and 61K is described. The toner cartridges 61Y, 61M, and 61C have the same structure except that the toners T that they accommodate differ in color. In describing the structure of the toner cartridges 61Y, 61M, and 61C, the structure of the toner cartridge 61M is described as a typical example.

The elements that constitute the toner cartridge 61M are described without the reference sign M. Note that the structure of the toner cartridge 61K is described later.

Figure 8:
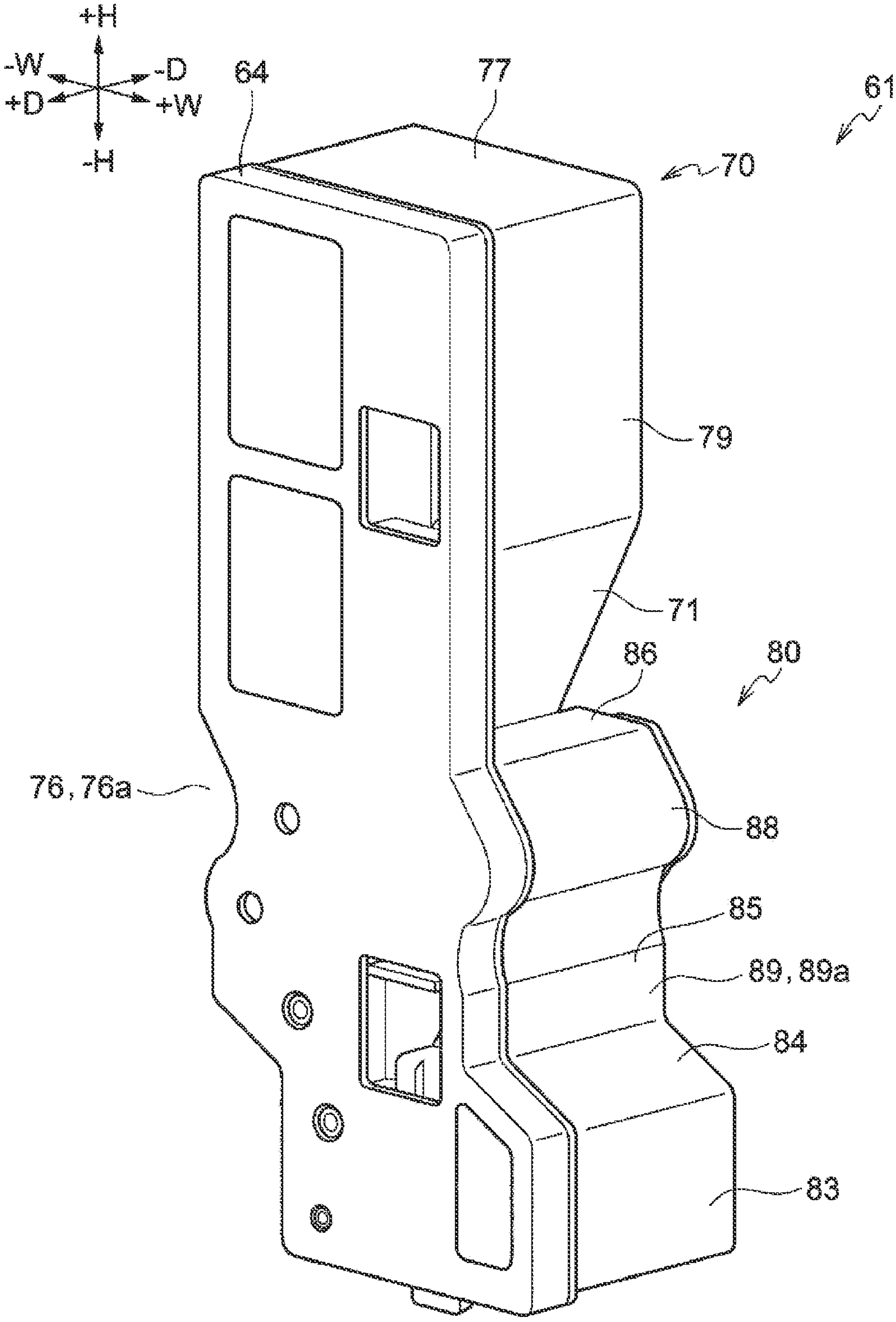
FIG. 8 is a perspective view showing a toner cartridge according to the exemplary embodiment.
Figure 9:
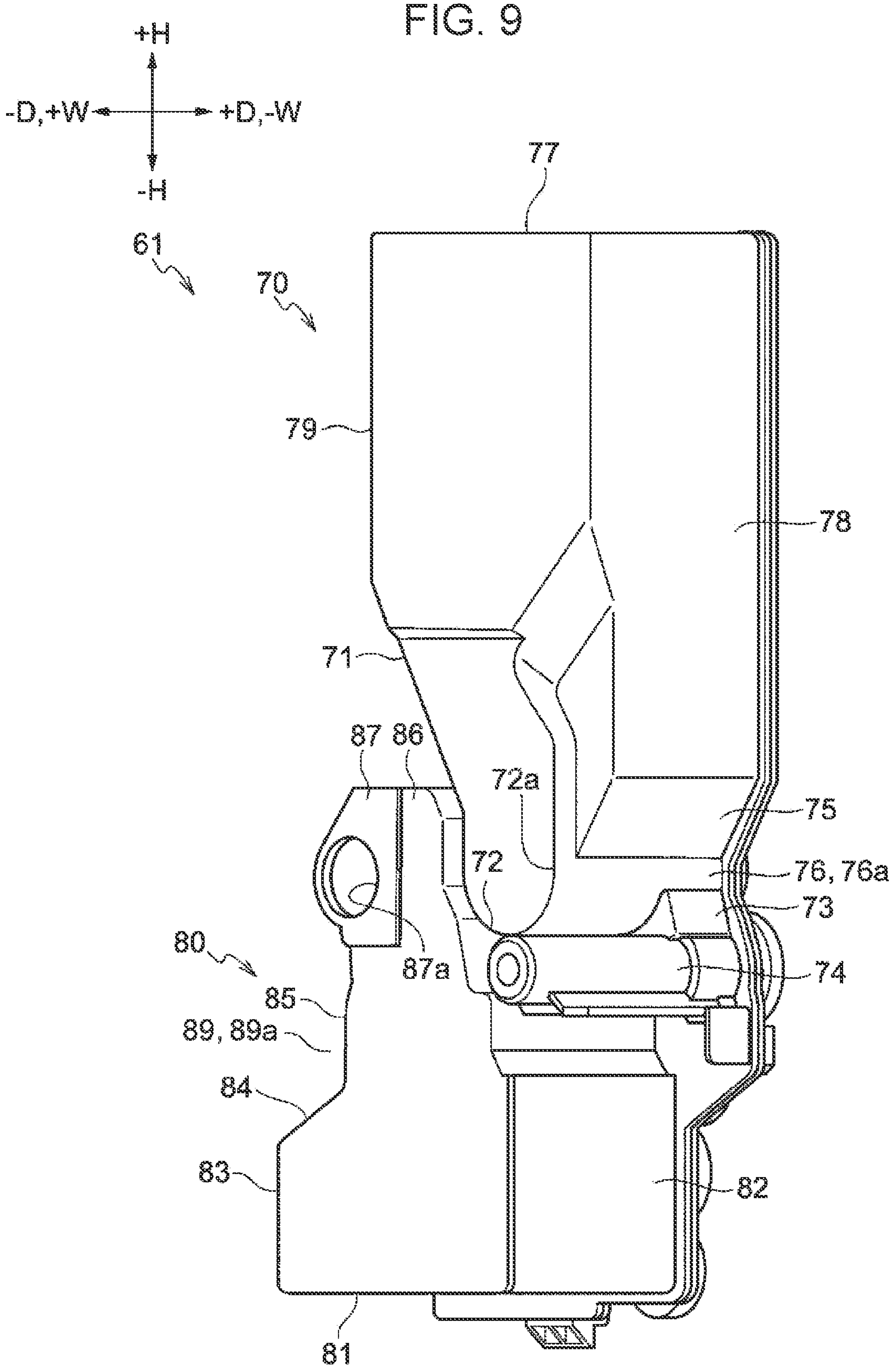
FIG. 9 is a perspective view showing the toner cartridge according to the exemplary embodiment.

As shown in FIGS. 8 and 9, the toner cartridge 61M includes a new-toner accommodating portion 70, a waste-toner accommodating portion 80 that is disposed on a lower side (the −H side) with respect to the new-toner accommodating portion 70, and a connecting portion 64. The connecting portion 64 is a plate-shaped member that is disposed on the +D side of the new-toner accommodating portion 70 and the waste-toner accommodating portion 80 and that integrally connects the new-toner accommodating portion 70 and the waste-toner accommodating portion 80 to each other. Note that the connecting portion 64 may constitute a +D-side wall of the new-toner accommodating portion 70 or the waste-toner accommodating portion 80.

New-Toner Accommodating Portion

Figure 7:
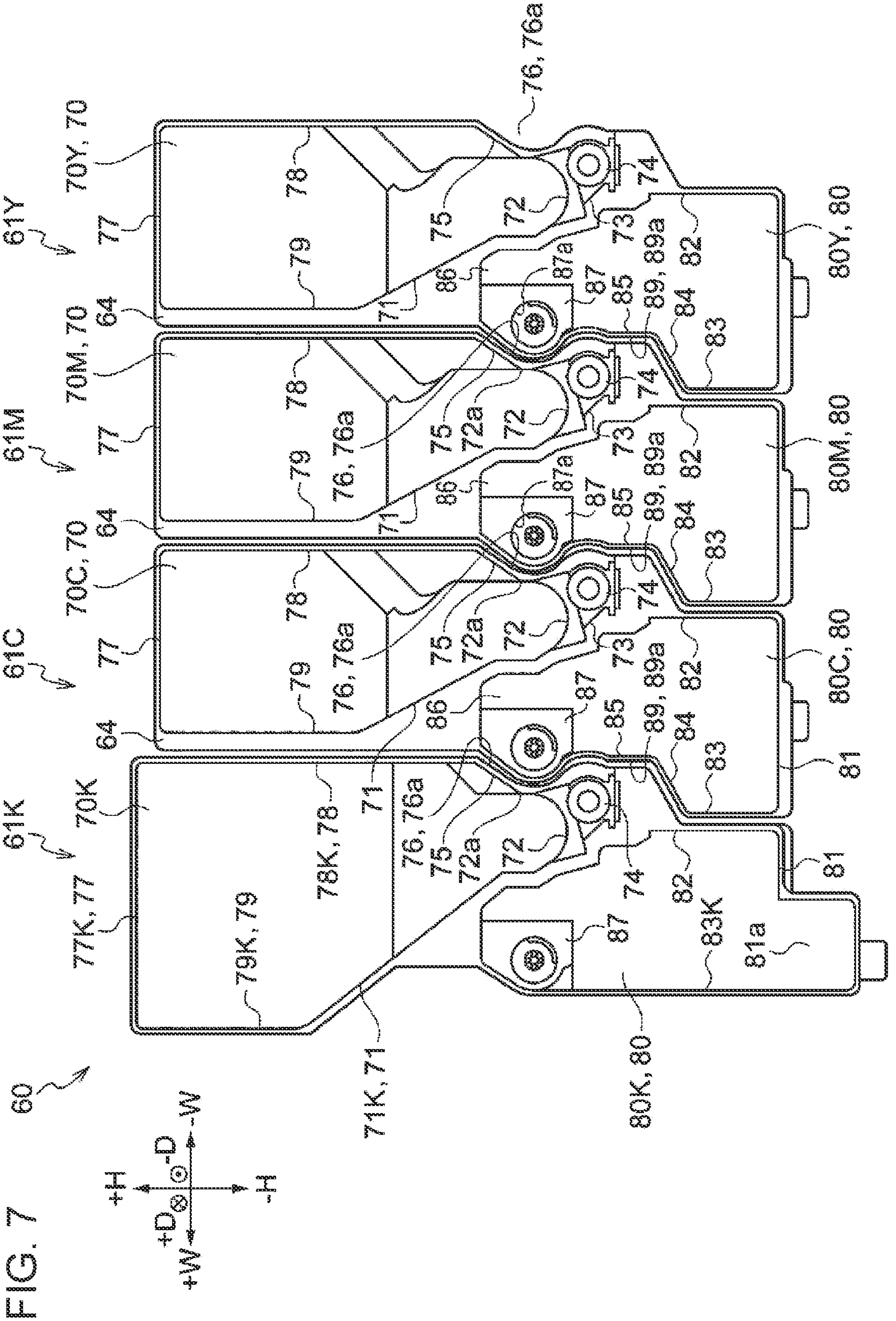
FIG. 7 is a rear view showing the toner cartridge group according to the exemplary embodiment.

The new-toner accommodating portion 70 is a box-shaped member that accommodates unused toner T (new toner) that is supplied to the developing device 40. The new-toner accommodating portion 70 is an example of a first accommodating portion. As shown in FIGS. 7 to 9, the new-toner accommodating portion 70 includes a rectangular top plate 77 that extends along a DW plane, a wall 78 that extends toward the −H side from a −W-side edge of the top plate 77 and along a DH plane, and a wall 79 that extends toward the −H side from a +W-side edge of the top plate 77 and along the DH plane. The new-toner accommodating portion 70 has an inclined portion 71 that is inclined from a −H-side edge of the +W-side wall 79 toward the −W side and the −H side. The new-toner accommodating portion 70 has an inclined portion 75 that is inclined from a −H-side edge of the −W-side wall 78 toward the +W side and the −H side. The new-toner accommodating portion 70 has a substantially semicircular bottom portion 72 that connects a lower end portion of the inclined portion 71 and a lower end portion of the inclined portion 75 when viewed from the −D side. The bottom portion 72 has at a −W-side end portion thereof a wall 72*a* that extends along the DH plane. The wall 72*a* is, of the walls disposed on the −W side of the new-toner accommodating portion 70, a −H-side wall. The wall 78 is, of the walls disposed on the −W side of the new-toner accommodating portion 70, a +H-side wall with respect to the wall 72*a*. The wall 78 protrudes toward the −W side with respect to the wall 72*a*.

The new-toner accommodating portion 70 has an extending portion 73 that protrudes further downward (the −H side) from part of the bottom portion 72 on a side of the connecting portion 64. The new-toner accommodating portion 70 has the circular cylindrical supplying portion 74 that protrudes toward the −D side from a −D-side end surface of the extending portion 73. In other words, the supplying portion 74 is provided on a lower-side (−H side) end portion of the new-toner accommodating portion 70.

The supplying portion 74 is disposed to protrude toward the W side with respect to the wall 72*a* of the bottom portion 72 of the new-toner accommodating portion 70. That is, the supplying portion 74 protrudes toward the −W side with respect to the wall 72*a* of the new-toner accommodating portion 70. The supplying portion 74 protrudes toward the −W side with respect to the waste-toner accommodating portion 80 that is described later.

When the toner cartridge 61 is attached to the body of the image forming apparatus 10, the supplying portion 74 is connected to the supply portion 45 of the developing device 40 of the photoconductor unit 32. Specifically, when the toner cartridge 61 is attached from the +D side of the photoconductor unit 32, the supplying portion 74 is disposed on an upper side (+H side) of the supply portion 45 of the developing device 40 and thus a shutter (not shown) is brought into an open state to connect the supplying portion 74 to the supply portion 45 (see FIG. 3). The shutter (not shown) is provided at the supplying portion 74 or the supply portion 45. In other words, when the toner cartridge 61 is attached to the body of the image forming apparatus 10, the supply portion 45 of the developing device 40 is connected to the supplying portion 74 in a state of being disposed on a lower side (−H side) of the supplying portion 74 of the new-toner accommodating portion 70. When the supplying portion 74 is connected to the supply portion 45, unused toner T that is accommodated in the new-toner accommodating portion 70 is supplied to the supplying path 41*a* of the developing device 40 through the supplying portion 74 and the supply portion 45. That is, the supplying portion 74 has the function of connecting the new-toner accommodating portion 70 to the outside. The supplying portion 74 is an example of a first connection portion. As long as the first connection portion is a portion that connects to the outside, the first connection portion may have any specific shape or structure.

At a location between the supplying portion 74 and the inclined portion 75, the new-toner accommodating portion 70 has a recessed portion 76 that is recessed with respect to the −W-side wall 78 when viewed from the −D side. In other words, the supplying portion 74 forms the recessed portion 76 together with the wall 78 that is connected to the inclined portion 75. The recessed portion 76 is an example of a first recessed portion. The recessed portion 76 is open to the −W side. The recessed portion 76 forms a space 76*a* that is defined by the supplying portion 74 and the wall 78 connected to the inclined portion 75 in the apparatus up-down direction. Note that the connecting portion 64 is such that a portion of the connecting portion 64 that overlaps the recessed portion 76 in the apparatus depth direction is recessed along the recessed portion 76.

Waste-Toner Accommodating Portion

The waste-toner accommodating portion 80 is a box-shaped member that accommodates used toner T (waste toner) discharged from the discharge portion 56 as a result of the removing device 50 scraping off the used toner T from the photoconductor drum 36. The waste-toner accommodating portion 80 is an example of a second accommodating portion. The waste-toner accommodating portion 80 has a rectangular bottom portion 81 that extends along the DW plane, a wall 82 that extends toward the +H side from a −W-side edge of the bottom portion 81 and along the DH plane, and a wall 83 that extends toward the +H side from a +W-side edge of the bottom portion 81 and along the DH plane. The waste-toner accommodating portion 80 has an inclined portion 84 that is inclined from a +H-side edge of the +W-side wall 83 toward the −W side and the +H side, and a wall 85 that extends toward the +H side from a +H-side edge of the inclined portion 84 and along the DH plane. A portion on the +H side with respect to the wall 85 of the waste-toner accommodating portion 80 is an end portion 86. The wall 85 is disposed between the wall 83 and the wall 82 in the apparatus width direction. In other words, the wall 83 and the inclined portion 84 protrude toward the +W side with respect to the wall 85. The bottom portion 81 is disposed on both sides of the wall 85 in the apparatus width direction, and part of the bottom portion 81 protrudes toward the +W side with respect to the wall 85. The inclined portion 84, the wall 83, and a portion on the +W side with respect to the bottom wall 81 and the wall 85 of the walls on two sides of the waste-toner accommodating portion 80 in the apparatus depth direction are each an example of a protruding portion. The wall 83 is formed on the +W side and the −H side of the waste-toner accommodating portion 80.

The waste-toner accommodating portion 80 includes the collecting portion 87 formed at the +H-side end portion 86. The collecting portion 87 protrudes toward the +W side with respect to the wall 85 of the waste-toner accommodating portion 80 and is formed to be on the W side with respect to the wall 83. That is, the wall 83 of the waste-toner accommodating portion 80 protrudes toward the +W side with respect to the collecting portion 87.

The waste-toner accommodating portion 80 is displaced toward the +W side with respect to the new-toner accommodating portion 70. Specifically, the wall 85 of the waste-toner accommodating portion 80 is disposed on the +W side with respect to the +W-side wall 79 of the new-toner accommodating portion 70. The wall 82 of the waste-toner accommodating portion 80 is disposed on the +W side with respect to the −W-side wall 78 of the new-toner accommodating portion 70. The wall 82 of the waste-toner accommodating portion 80 is disposed on the +W side with respect to the wall 72*a* of the bottom portion 72 of the new-toner accommodating portion 70 and is disposed on the +W side with respect to the entire supplying portion 74. The wall 82 of the waste-toner accommodating portion 80 is disposed at a position where it overlaps the bottom portion 72 of the new-toner accommodating portion 70 in the apparatus width direction. The end portion 86 of the waste-toner accommodating portion 80 is disposed on the +W side with respect to the bottom portion 72 of the new-toner accommodating portion 70 and part of the end portion 86 overlaps the bottom portion 72 in the up-down direction. Part of the end portion 86 overlaps the inclined portion 71 of the new-toner accommodating portion 70 in the apparatus width direction.

The collecting portion 87 of the toner cartridge 61M has a shape that curves in a protruding shape along the recessed portion 76 of the toner cartridge 61C that is disposed on the +W side of the toner cartridge 61M. In this way, at a position where the collecting portion 87 overlaps the recessed portion 76 in the apparatus up-down direction, the collecting portion 87 protrudes toward the +W side with respect to the wall 85 of the waste-toner accommodating portion 80. Of the −W-side walls of the waste-toner accommodating portion a portion that is curved in a protruding shape at a position situated in correspondence with the position of a hole portion 87*a* (described below) of the collecting portion 87 is called a curved portion 88 (see FIG. 12). The curved portion 88 has an arcuate curved shape. That is, a portion of the collecting portion 87 that protrudes toward the +W side with respect to the wall of the waste-toner accommodating portion 80 has a curved shape.

The collecting portion 87 has the columnar hole portion 87*a* that is connected to the discharge portion 56 of the removing device 50 when the toner cartridge 61 is attached to the image forming apparatus 10. Specifically, when the toner cartridge 61 is attached from the +D side of the photoconductor unit 32, the discharge portion 56 of the removing device 50 is inserted into the hole portion 87*a* and, as a result of a shutter (not shown) being brought into an open state, is connected to the collecting portion 87. The shutter (not shown) is provided at the hole portion 87*a* or the discharge portion 56. The hole portion 87*a* of the collecting portion 87 is disposed on the +H side with respect to the supplying portion 74 of the new-toner accommodating portion 70. When the toner cartridge 61 is attached to the photoconductor unit 32, the waste-toner accommodating portion 80 collects and accommodates used toner T that is accommodated in the removing device 50 through the discharge portion 56 and the hole portion 87*a* of the collecting portion 87. That is, the hole portion 87*a* of the collecting portion 87 has the function of connecting the waste-toner accommodating portion 80 to the outside. The hole portion 87*a* is an example of a second connection portion. As long as the second connection portion is a portion that connects to the outside, the second connection portion may have any specific shape or structure.

At a location between the collecting portion 87 and the inclined portion 84, the waste-toner accommodating portion 80 has a recessed portion 89 that is recessed with respect to the collecting portion 87 and the +W-side wall 83 when viewed from the −D side. In other words, the collecting portion 87 forms the recessed portion 89 together with the wall 85 that is connected to the inclined portion 84. The recessed portion 89 is an example of a second recessed portion. The recessed portion 89 is open to the +W side. The recessed portion 89 forms a space 89*a* that is defined by the collecting portion 87 and the wall 83 connected to the inclined portion 84 in the apparatus up-down direction. Note that the connecting portion 64 is such that a portion of the connecting portion 64 that overlaps the recessed portion 89 in the apparatus depth direction is recessed along the recessed portion 89.

A new-toner accommodating portion 70K of the toner cartridge 61K has a structure that is the same as the structure of the new-toner accommodating portions 70Y, 70M, and 70C of the toner cartridges 61Y, 61M, and 61C except that the capacity of the new-toner accommodating portion 70K is larger than the capacities of the new-toner accommodating portions 70Y, 70M, and 70C. Specifically, the length in the apparatus width direction between a wall 78K and a wall 79K facing the apparatus width direction of the new-toner accommodating portion 70K is larger than the lengths in the apparatus width direction between the walls 78Y, 78M, and 78C and the respective walls 79Y, 79M, and 79C facing the apparatus width direction of a corresponding one of the new-toner accommodating portions 70Y, 70M, and 70C. The length in the apparatus up-down direction between a bottom portion 72K and a top plate 77K of the new-toner accommodating portion 70K is larger than the lengths in the apparatus up-down direction between the bottom portions 72Y, 72M, and 72C and the respective top plates 77Y, 77M, and 77C of a corresponding one of the new-toner accommodating portions 70Y, 70M, and 70C. Note that the position in the apparatus up-down direction of a recessed portion 76 with respect to a supplying portion 74 of the toner cartridge 61K is situated in correspondence with the positions of the recessed portions 76 with respect to the respective supplying portions 74 of the respective toner cartridges 61Y, 61M, and 61C.

A waste-toner accommodating portion 80K of the toner cartridge 61K has an extending portion 81*a* formed as a result of part of the +W side of a bottom portion 81 extending toward the −H side. The waste-toner accommodating portion 80K is such that a collecting portion 87K is disposed on the W side with respect to the wall 79K of the new-toner accommodating portion 70K. The waste-toner accommodating portion 80K has, in place of the +W-side walls 83 and 85 and the inclined portions 84 of the corresponding waste-toner accommodating portions 80Y, 80M, and 80C, a wall 83K that extends along the apparatus up-down direction from the collecting portion 87K to the extending portion 81*a*. That is, the collecting portion 87K does not protrude in the apparatus width direction with respect to the wall 83K. In this way, the toner cartridge 61K does not have a recessed portion 89 of each of the toner cartridges 61Y, 61M, and 61C. Other than the points mentioned above, the waste-toner accommodating portion 80K has a structure that is the same as the structure of the waste-toner accommodating portions 80Y, 80M, and 80C.

Others

When the toner cartridge group 60 is attached to the body of the image forming apparatus 10, the curved portion 88 of the toner cartridge 61M is disposed so as enter the recessed portion 76 of the toner cartridge 61C that is disposed on the +W side of the toner cartridge 61M. That is, when the toner cartridge group 60 is attached to the body of the image forming apparatus 10, the curved portion 88 of one toner cartridge 61 is disposed so as to enter the recessed portion 76 of another toner cartridge that is disposed on the +W side of the one toner cartridge 61. In other words, when the toner cartridge group 60 is attached to the body of the image forming apparatus 10, the curved portion 88 of one toner cartridge 61 is disposed so as to penetrate into the space 76*a* of another toner cartridge 61 that is disposed on the +W side of the one toner cartridge 61.

When the toner cartridge group 60 is attached to the body of the image forming apparatus 10, the supplying portion 74 of the toner cartridge 61M is disposed so as to enter the recessed portion 89 of the toner cartridge 61Y that is disposed on the −W side of the toner cartridge 61M. That is, when the toner cartridge group 60 is attached to the body of the image forming apparatus 10, the supplying portion 74 of one toner cartridge 61 is disposed so as to enter the recessed portion 89 of another toner cartridge 61 that is disposed on the −W side of the one toner cartridge 61. In other words, the wall 83 and the inclined portion 84 of one toner cartridge 61 are disposed below the supplying portion 74 of another toner cartridge 61 that is disposed on the +W side of the one toner cartridge 61. Further, in other words, when the toner cartridge group 60 is attached to the body of the image forming apparatus 10, the supplying portion 74 of one toner cartridge 61 is disposed so as to penetrate into the space 89*a* of another toner cartridge 61 that is disposed on the −W side of the one toner cartridge 61.

Operations and Effects

Next, the operations and effects of the exemplary embodiment are described. Note that, in the explanation, when comparative forms in relation to the exemplary embodiment are to be described and, for example, the same components as those of the image forming apparatus 10 of the exemplary embodiment are used, reference signs and names of such components and the like are used as they are.

In each of the toner cartridges 61Y, 61M, and 61C of the exemplary embodiment, of the +W-side walls of the waste-toner accommodating portion 80, the wall that is situated at a position where it overlaps the hole portion 87*a* in the apparatus width direction has the curved portion 88 that protrudes toward the +W side. Therefore, compared to a structure in which the +W-side wall of the waste-toner accommodating portion 80 that is situated at a position where it overlaps the hole portion 87*a* in the apparatus width direction is flat, the toner cartridges 61Y, 61M, and 61C of the exemplary embodiment are such that the capacities of the toner cartridges 61Y, 61M, and 61C can be increased.

In each toner cartridge 61 of the exemplary embodiment, the wall 78 of the new-toner accommodating portion 70 protrudes toward the W side with respect to the wall 72*a* of the bottom portion 72. Therefore, compared to a structure in which the −W-side wall 78 of the new-toner accommodating portion 70 does not protrude toward the W side with respect to the wall 72*a*, the toner cartridges 61 of the exemplary embodiment are such that the capacities of the toner cartridges 61Y, 61M, and 61C can be increased.

In each toner cartridge 61 of the exemplary embodiment, the supplying portion 74 protrudes toward the −W side with respect to the wall 72*a* of the new-toner accommodating portion 70 and the entire supplying portion 74 is disposed on the −W side with respect to the wall 82 of the waste-toner accommodating portion 80. Therefore, compared to a structure in which the supplying portion 74 is provided on the +W side with respect to the wall 82 of the waste-toner accommodating portion 80, the toner cartridges 61 of the exemplary embodiment are such that the capacities of the waste-toner accommodating portions 80 can be increased.

In a structure in which the supply portions 45 of the image forming apparatus 10 are disposed on the −H side of the supplying portions 74 of the new-toner accommodating portions 70, the toner cartridges 61 of the exemplary embodiment are such that the capacities of the waste-toner accommodating portions 80 can be further increased compared to that of a structure in which the supplying portions 74 are provided on the +W side with respect to the walls 82 of the waste-toner accommodating portions 80.

In each of the toner cartridges 61Y, 61M, and 61C of the exemplary embodiment, the recessed portion 76 that is formed by the supplying portion 74 and the wall 78 that is connected to the inclined portion 75 of the new-toner accommodating portion 70 is situated at a position where it overlaps the hole portion 87*a* of the waste-toner accommodating portion 80 in the apparatus width direction. Therefore, compared to a structure in which the recessed portion 76 and the hole portion 87*a* do not overlap each other in the apparatus width direction, in the toner cartridge group 60, the toner cartridges 61 of the exemplary embodiment are such that the new-toner accommodating portion 70 of one toner cartridge 61 can in the apparatus width direction be disposed close to the hole portion 87*a* of another toner cartridge 61 that is disposed on the −W side of the one toner cartridge 61.

In each of the toner cartridges 61Y, 61M, and 61C of the exemplary embodiment, the recessed portion 89 that is formed by the hole portion 87*a* of the collecting portion 87 and the wall 85 that is connected to the inclined portion 84 of the waste-toner accommodating portion 80 is situated at a position where it overlaps the supplying portion 74 of the new-toner accommodating portion 70 in the apparatus width direction. Therefore, compared to a structure in which the recessed portion 89 and the supplying portion 74 do not overlap each other in the apparatus width direction, in the toner cartridge group 60, the toner cartridges 61 of the exemplary embodiment are such that the waste-toner accommodating portion 80 of one toner cartridge 61 can in the apparatus width direction be disposed close to the supplying portion 74 of another toner cartridge 61 that is disposed on the +W side of the one toner cartridge 61.

In each of the toner cartridges 61Y, 61M, and 61C of the exemplary embodiment, the supplying portion 74 forms the recessed portion 76 together with the wall 78 that is connected to the inclined portion 75, and the collecting portion 87 forms the recessed portion 89 together with the wall 85 that is connected to the inclined portion 84. Therefore, compared to when the supplying portion 74 is disposed along the wall 72*a* of the new-toner accommodating portion 70 and the collecting portion 87 is disposed along the wall 85 of the waste-toner accommodating portion 80, in the toner cartridge group 60, the toner cartridges 61Y, 61M, and

61C of the exemplary embodiment are such that the supplying portion 74 of one toner cartridge 61 and the collecting portion 87 of another toner cartridge 61 that is disposed on the −W side of the one toner cartridge 61 can be disposed close to each other.

In each of the toner cartridges 61Y, 61M, and 61C of the exemplary embodiment, a portion of the collecting portion 87 that protrudes toward the +W side with respect to the wall 85 of the waste-toner accommodating portion 80 has a curved shape. Therefore, compared to a structure in which the portion of the collecting portion 87 that protrudes toward the +W side with respect to the wall 85 of the waste-toner accommodating portion 80 has a corner, in the toner cartridge group 60, the toner cartridges 61Y, 61M, and 61C of the exemplary embodiment are such that the overlap amount by which the collecting portion 87 of one toner cartridge 61 overlaps another toner cartridge 61 that is disposed on the +W side of the one toner cartridge 61 can be reduced.

In each of the toner cartridges 61 of the exemplary embodiment, the waste-toner accommodating portion 80 is displaced toward the +W side with respect to the new-toner accommodating portion 70, and the collecting portion 87 is disposed on the +H side with respect to the supplying portion 74. Therefore, compared to a structure in which the supplying portion 74 is disposed on the +H side with respect to the collecting portion 87, each toner cartridge 61 of the exemplary embodiment is such that the length of the toner cartridge 61 in the apparatus up-down direction can be decreased with the capacity of the toner cartridge 61 being maintained.

In each of the toner cartridges 61Y, 61M, and 61C of the exemplary embodiment, the waste-toner accommodating portion 80 has a wall 83 and an inclined portion 84 that protrude toward the +W side with respect to the wall 85. Therefore, compared to a structure in which a wall that is disposed on the +W side of the waste-toner accommodating portion 80 and on the H side with respect to the collecting portion 87 is flat in its entirety, the toner cartridges 61Y, 61M, and 61C of the exemplary embodiment are such that the capacities of the toner cartridges 61 can be increased.

In each of the toner cartridges 61Y, 61M, and 61C of the exemplary embodiment, the wall 83 protrudes toward the +W side with respect to the collecting portion 87. Therefore, compared to a structure in which a wall that is disposed on the +W side of the waste-toner accommodating portion 80 and on the H side with respect to the collecting portion 87 is provided in its entirety on the W side with respect to the collecting portion 87, the toner cartridges 61Y, 61M, and 61C of the exemplary embodiment are such that the capacities of the toner cartridges 61 can be increased.

The image forming apparatus 10 of the exemplary embodiment includes toner cartridges 61Y, 61M, and 61C. Therefore, compared to a structure that includes toner cartridges in which the collecting portion 87 is provided on the −W side with respect to the wall 85 of the waste-toner accommodating portion 80, the image forming apparatus 10 of the exemplary embodiment is such that the capacities of the toner cartridges 61 can be increased with the size of the image forming apparatus 10 being maintained.

In the image forming apparatus 10 of the exemplary embodiment, the photoconductor units 32Y, 32M, 32C, and 32K overlap each other in the apparatus up-down direction. Therefore, compared to a structure in which the positions of the photoconductor units 32Y, 32M, 32C, and 32K in the apparatus up-down direction are displaced from each other, the image forming apparatus 10 of the exemplary embodiment is such that the length of the image forming apparatus 10 in the apparatus width direction can be decreased.

In the image forming apparatus 10 of the exemplary embodiment, the supply portions 45 of the developing devices 40 and the discharge portions 56 of the removing devices 50 are each formed on the +D side. Therefore, compared to when the supply portions 45 of the developing devices 40 are formed on the −D side and the discharge portions 56 of the removing devices 50 are formed on the +D side, the image forming apparatus 10 of the exemplary embodiment is such that a connection destination of each supply portion 45 and a connection destination of each discharge portion 56 can both be disposed on the +D side.

In the image forming apparatus 10 of the exemplary embodiment, the discharge portion 56 of one photoconductor unit 32 overlaps in the apparatus width direction the supply portion 45 of another photoconductor unit 32 that is disposed on the +W side of the one photoconductor unit 32. Therefore, compared to a structure in which the discharge portion 56 of one photoconductor unit 32 is in the apparatus width direction disposed away from the supply portion of another photoconductor unit 32 that is disposed on the +W side of the one photoconductor unit 32, the image forming apparatus 10 is such that the length of the image forming apparatus 10 in the apparatus width direction can be decreased.

In each of the toner cartridges 61Y, 61M, and 61C of the exemplary embodiment, of the −W-side walls of the waste-toner accommodating portion 80, a wall that is disposed at a position situated in correspondence with the position of the hole portion 87*a* in the apparatus up-down direction is a curved portion 88 that has a surface facing the +W side and the −H direction. Therefore, compared to a structure in which, of the −W-side walls of the waste-toner accommodating portion 80, a wall that is disposed at a position situated in correspondence with the position of the hole portion 87*a* in the apparatus up-down direction faces only the +W side, the toner cartridges 61Y, 61M, and 61C of the exemplary embodiment are such that the capacities of the waste-toner accommodating portions 80 can be increased.

Compared to a structure in which, of the −W-side walls of the waste-toner accommodating portion 80, a wall that is disposed at a position situated in correspondence with the position of the hole portion 87*a* in the apparatus up-down direction is flat, the toner cartridges 61Y, 61M, and 61C of the exemplary embodiment are such that the capacities of the waste-toner accommodating portions 80 can be increased.

As described above, although a specific exemplary embodiment has been described in detail, the disclosure is not limited to the above-described exemplary embodiment and various modifications, changes, and improvements are possible within the scope of technical ideas of the disclosure.

For example, in the exemplary embodiment, a portion of the collecting portion 87 of each of the toner cartridges 61Y, 61M, and 61C, the portion protruding toward the +W side with respect to the wall 85 of the waste-toner accommodating portion 80, is curved. However, such a portion of the collecting portion 87 of each of the toner cartridges 61Y, 61M, and 61C, the portion protruding toward the +W side with respect to the wall 85 of the waste-toner accommodating portion 80, may have a corner.

In the exemplary embodiment, each waste-toner accommodating portion 80 is described as having a wall 83, an inclined portion 84, and a bottom portion 81, which protrude toward the +W side with respect to the wall 85. However, in each waste-toner accommodating portion 80, a portion situated on the −H side with respect to the wall 85 need not protrude toward the +W side with respect to the wall 85.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner cartridge comprising:

a first accommodating portion that accommodates toner;

a second accommodating portion that is disposed on one side in a first direction with respect to the first accommodating portion and that accommodates toner, and that has a wall on one side in a second direction, the second direction intersecting with the first direction;

a first connection portion that is provided at the first accommodating portion and that connects the first accommodating portion to outside; and a second connection portion that is provided at an end portion of the second accommodating portion, the end portion being situated on the other side in the first direction, and that connects the second accommodating portion to outside, wherein the first accommodating portion has a wall on the other side in the second direction and has a first recessed portion, wherein the first recessed portion is formed to be adjacent to the wall of the first accommodating portion, and is open to the other side in the second direction, wherein the second connection portion is disposed on the one side in the second direction with respect to the first connection portion, wherein a the wall of the second accommodating portion has a curved portion that protrudes toward the one side in the second direction, wherein the curved portion includes a part of the wall of the second accommodating portion that overlaps with the second connection portion in the second direction, wherein the first connection portion is provided at an end portion of the first accommodating portion on the one side in the first direction, and is located on the other side in the second direction with respect to a portion of the wall of the first accommodating portion being situated on the other side in the second direction and on the other side in the first direction, and the first connection portion forms, together with the wall of the first accommodating portion, the first recessed portion that opens to the other side in the second direction, and wherein the curved portion is shaped so as to be configured to enter the first recessed portion of another toner cartridge when the toner cartridge is disposed on the other side in the second direction of another toner cartridge.

2. The toner cartridge according to claim 1, wherein the first recessed portion is formed to be closer to the one side in the second direction than a part of a wall that is situated on at least one of the one side or the other side in the first direction, and wherein the first recessed portion is situated at a position where the first recessed portion overlaps the second connection portion in the first direction.

3. The toner cartridge according to claim 1, wherein, at a position where the second connection portion overlaps the first recessed portion in the first direction, the second connection portion protrudes with respect to the wall of the second accommodating portion, toward the one side in the second direction, and the second connection portion forms, together with the wall of the second accommodating portion situated on the one side in the second direction, a second recessed portion that overlaps the first connection portion in the first direction and opens to the one side in the second direction.

4. The toner cartridge according to claim 3, wherein a portion of the second connection portion has a curved shape, the portion protruding toward the one side in the second direction beyond the wall of the second accommodating portion that is situated on the one side in the second direction.

5. The toner cartridge according to claim 1, wherein the second accommodating portion is disposed to be at least partly displaced toward the one side in the second direction with respect to the first accommodating portion, and wherein the second connection portion is disposed on the other side in the first direction with respect to the first connection portion.

6. The toner cartridge according to claim 1, wherein the second accommodating portion is disposed to be at least partly offset toward the one side in the second direction with respect to the first accommodating portion, and the second accommodating portion has a protruding portion that protrudes toward the one side in the second direction with respect to the wall of the second accommodating portion.

7. The toner cartridge according to claim 6, wherein the protruding portion protrudes toward the one side in the second direction with respect to the second connection portion.

8. An image forming apparatus comprising:

the toner cartridge according to claim 1 in which the first accommodating portion accommodates unused toner and the second accommodating portion accommodates used toner; and an image forming section that extends in the second direction and that forms an image on a recording medium by using the unused toner supplied from the first accommodating portion, and that discharges toner remaining at the image forming section after the image has been formed toward the second accommodating portion.

* * * * *